Feb. 22, 1949. H. A. WHEELER 2,462,796
REGULATOR
Filed Dec. 11, 1944 2 Sheets-Sheet 1
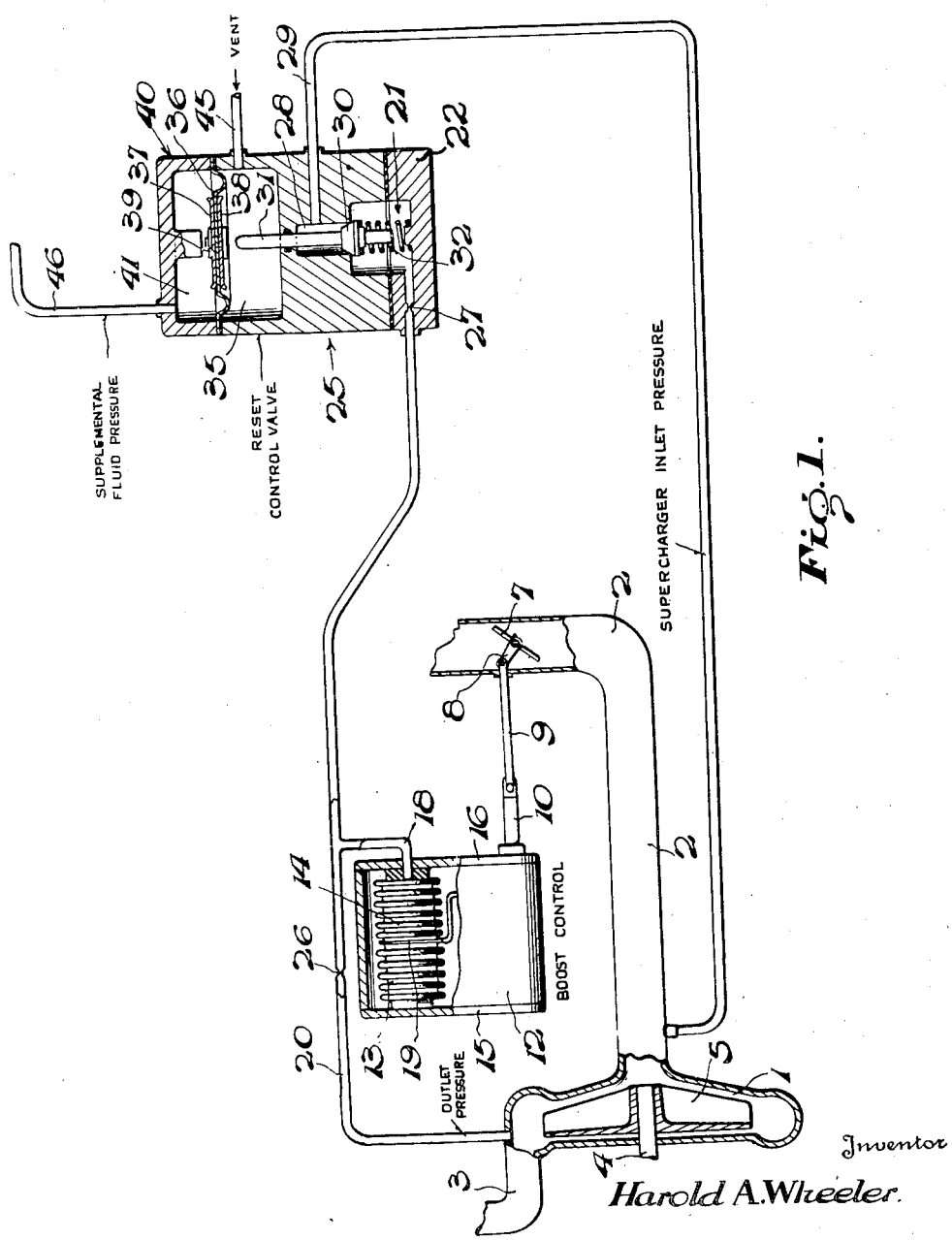
Inventor
Harold A. Wheeler.
By Herbert I. Davis, Jr.
Attorney

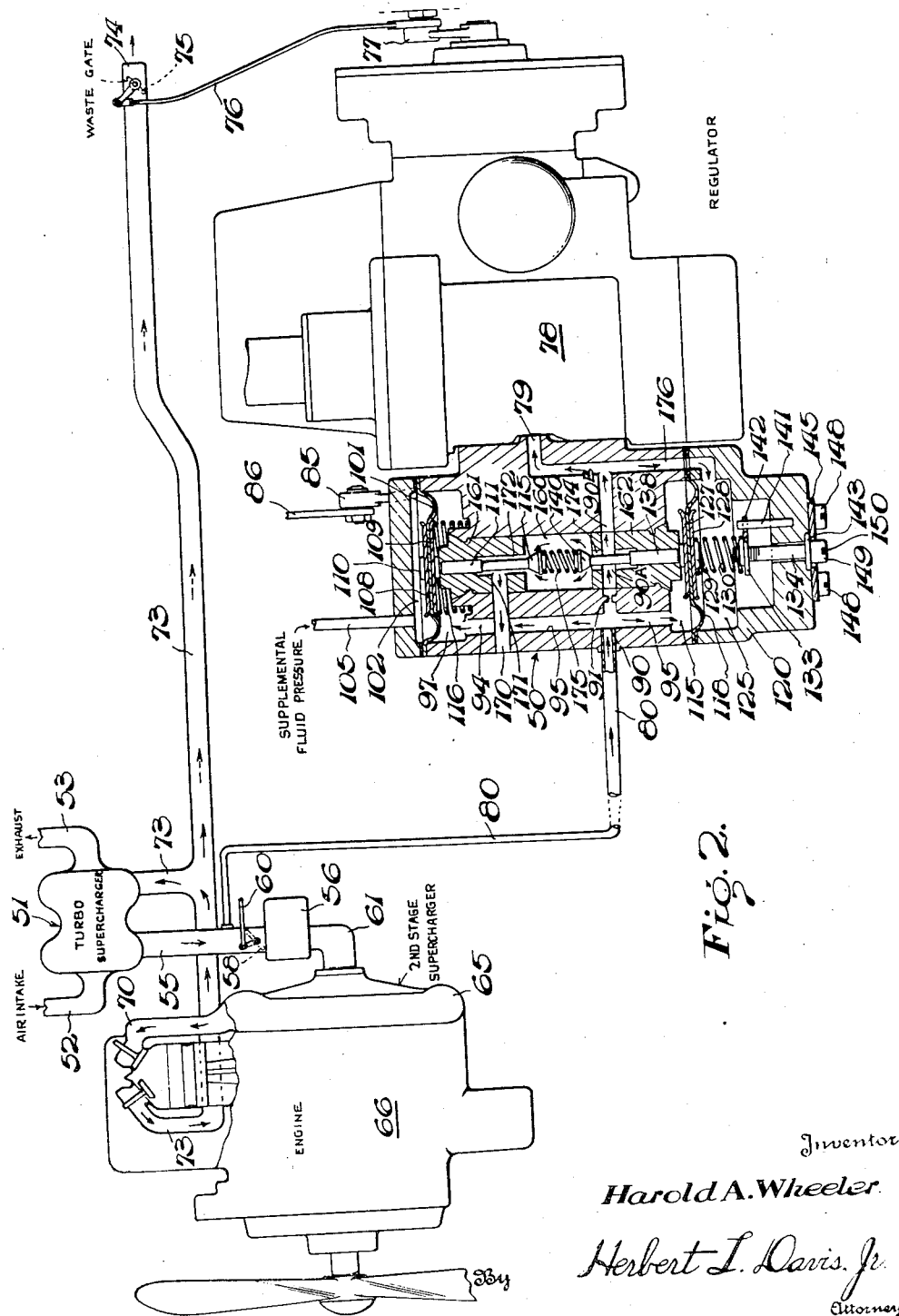

Patented Feb. 22, 1949

2,462,796

UNITED STATES PATENT OFFICE 2,462,796

REGULATOR

Harold A. Wheeler, Alwood, N. J., assignor to Bendix Aviation Corporation, Teterboro, N. J., a corporation of Delaware Application December 11, 1944, Serial No. 567,668

6 Claims. (Cl. 123—25)

1

The present invention relates to regulators and more particularly to novel means for controlling the air inlet pressure of a supercharged aircraft engine so as to maintain the pressure thereof at either of two preselected absolute pressures.

During the operation of so-called "water" or "anti-knock" fluid injection systems for suppressing predetonation in internal combustion engines, an increase in the air inlet pressure of the induction system for the engine is permissible and desirable in order that greater engine power may be obtained that when such injection system is not in operation. Therefore, an object of the present invention is to provide a regulator responsive to operation of such an injection system for effecting a predetermined increase in the air pressure in the induction system.

Another object of the invention is to provide a regulator having novel means for shifting the setting of a novel air leak means in response to operation of the supplemental fluid injection system.

Another object of the invention is to provide a novel regulator arranged to maintain the air inlet of a supercharged aircraft engine at a first preselected pressure value, when such supplemental fluid injection system is not in operation and said regulator further having a novel air leak arranged to maintain such pressure at a second relatively higher reset pressure when such injection system is in operation.

Another object of the invention is to provide novel means for regulating the setting of the air leak in response to changes in atmospheric pressure so as to maintain a substantially constant reset pressure value for the regulator.

Another object of the invention is to provide second novel means for adjusting the setting of the air leak so as to maintain the maximum reset pressure of the regulator substantially constant under varying altitude conditions.

A further object of the invention is to provide a novel means for regulating the pressure line to a regulator for a supercharger so as to vary its controlling effect in response to operation of a supplemental fluid injection system for an aircraft engine.

These and other objects and features of the invention are pointed out in the following description in terms of the embodiment thereof which is

2 shown in the accompanying drawings. It is to be understood, however, that the drawings are for the purpose of illustration only, and are not designed as a definition of the limits of the invention, reference being had to the appended claims for this purpose.

In interpreting the appended claims, where they refer to a supercharger, they are to be construed as including application of the invention to any known type supercharger, however driven, and to any type of throttle controlled engine, and, where the claims are directed to less than all of the elements disclosed, they are intended to cover possible uses of the recited elements in installations which lack the non-recited elements.

In the drawings, wherein reference numerals refer to like parts throughout the several views:

Figure 1 is a partly schematic view illustrating the manner in which one form of the novel regulator control means may be connected in operating relation in the induction and supplemental fluid injection system for an aircraft engine.

Figure 2 is a partly schematic view illustrating the manner in which a second form of the novel regulator control means may be connected in operating relation.

Referring first to Figure 1, there is indicated by numeral 1 a supercharger having an air inlet conduit 2 and an air outlet conduit 3 forming the intake manifold of an internal combustion engine whose crank-shaft or other power shaft (not shown) drives through a shaft 4 and other suitable mechanical connections the impeller blades 5 of the supercharger 1.

A throttle valve 7 is provided in the inlet conduit 2 and has an operating arm 8. Operatively connected to the arm 8 through link 9 is the piston rod 10 of a servo motor provided in a boost control 12.

The boost control 12 may be any suitable type well known in the art such as shown in the Patent No. 2,205,354 granted to David Gregg et al. under date of June 18, 1940.

The latter boost control 12 includes a pair of hollow flexible walled cylinders or bellows 13 and 14 mounted between end walls 15 and 16 of the boost control 12. The bellows 13 is sealed under vacuum or under a predetermined pressure although a vacuum or near vacuum is preferred. The bellows 14 has a direct communication with the intake manifold 3 or outlet pressure from the supercharger 1 by reason of a conduit 18 leading into said bellows 14.

A plate 19 is interposed between the bellows 13 and 14. The plate 19 is connected through suitable means not shown to a servo valve controlling the operation of a servomotor connected to the piston rod. Thus upon a change in the pressure acting within the bellows 14 a corresponding change in the position of the piston rod 10 is effected for controlling the valve 7, as will be explained hereinafter.

The conduit 18 leads from the bellows 14 into a conduit 20 which opens at one end into the intake manifold 3. The opposite end of the conduit 20 opens into a chamber 21 formed by suitable recesses provided in a cap 22 and a casing or block 25. The cap 22 is fastened to the block 25 in any suitable manner.

A restriction 26 is formed in the conduit 20 betweent the conduit 18 and the intake manifold 3, while a second restriction 27 is formed in the conduit 20, between the conduit 18 and the chamber 21.

A passage 28 leads from the chamber 21 into a conduit 29 leading to the air inlet pressure conduit 2 of the supercharger 1. A valve 30 having a valve stem 31 controls the opening of the chamber 21 into the passage 28. The valve 30 is biased under tension of a spring 32 into a closed position.

The stem projects into a chamber 35 formed in the block 25. A diaphragm 36 having plates 37 and 38 secured at opposite sides by a rivet 39 extends across the chamber 35. The diaphragm 36 is suitably fastened between the end of the block 25 and a suitable cover cap 40. A recess 41 is formed in the cover cap 40 forming a chamber at the opposite side of the diaphragm 36 from the chamber 35.

A suitable vent 45 opens the chamber 35 to atmosphere, while a conduit 46 leads from the supply line of a "water" or "anti-knock" fluid injection system into the chamber 41. The supplemental fluid injection system may be of a type shown and described in the copending application of Howard A. Alexanderson Serial No. 551,036 filed August 24, 1944 and now U. S. Patent No. 2,453,653, granted November 9, 1948 to Howard A. Alexanderson and assigned to Bendix Aviation Corporation, or of any other suitable type well known in the art.

In the operation of the system shown in Figure 1, it will be seen that during normal operation an increase in the pressure at the intake manifold 3 of the carburetor of an aircraft engine above a value for which the boost control 12 has been set will cause the bellows 14 to expand and shift the plate 19. Such movement of the plate 19 operates a servo valve in a direction causing a servomotor controlled thereby to shift the piston 10 so as to move the valve 7 in a closing direction and decrease the pressure at the intake manifold 3 to a predetermined value. A decrease in the pressure at the intake manifold 3 below the predetermined value will cause an opposite effect.

Upon initiating the operation of the fluid injection system as by opening a supply valve, not shown, a fluid medium will be supplied to the conduit 46 under pressure of a supply pump or other suitable means well known in the art, whereupon the fluid pressure in the chamber 41 will be increased, causing a deflection of the diaphragm 36 under the force of the fluid pressure. Such deflection of the diaphragm 36 will cause the rivet 39 to contact the adjacent end of the stem 31 and under force of the fluid medium bias the valve member 30 to a valve open position.

The opening of the valve 30 opens the end of the conduit 20 through the restricted orifice 27, chamber 21, passage 28 and conduit 29 to the inlet or atmospheric pressure at the conduit 2 and thus provides an air leak for varying the controlling effect of the intake manifold pressure on the bellows 14. Thus when the water emergency injection system is in operation the air leak valve 30 will be open, whereupon the flow of air through the restricted passages 26 and 27 will cause a pressure drop at the opening of the conduit 18 into the conduit 20 so that the pressure effecting the bellows 14 will be proportionally less than that at the intake manifold 3.

The effect of such pressure drop will be to cause the boost control 12 through operation of the bellows 14 to maintain a higher pressure at the intake manifold 3 during operation of the supplemental fluid injection system. Such increased boost or intake manifold pressure will permit greater engine power to be obtained during operation of the supplemental fluid injection system than would be otherwise effected.

However, upon the operation of the supplemental fluid injection system being discontinued, or upon failure of the supplemental fluid supply, the diaphragm 36 is released from the pressure of the latter fluid and the valve 30 under tension of the spring 32 is biased to a closed position, whereupon the boost control 12 is reset to a lower normal safe operating pressure and responds directly to the pressure at the intake manifold 3.

In the form of the invention shown in Figure 1, as the altitude of the aircraft increases the prevailing atmospheric pressure decreases, whereupon during operation of the supplemental fluid injection system a corresponding increase in the pressure drop at the conduit 18 will be effected.

In order to effect a constant pressure drop at the boost control regardless of changes in atmospheric pressure there has been provided the novel regulator shown in detail section in Figure 2 and having a casing or block indicated generally by the numeral 50.

In the system shown in Figure 2 there is provided a first stage turbo supercharger indicated by the numeral 51. The turbo supercharger 51 may be of conventional type having an air intake conduit 52 and an exhaust conduit 53 for conducting exhaust gases from a turbine driving the supercharger 51.

An air conduit 55 leads from the supercharger 51 to the intake of a carburetor 56. A throttle valve 58 controls the carburetor intake and may be controlled by the pilot from the cabin of the plane through an operating rod 60.

A second conduit 61 leads from the outlet of the carburetor 56 to the inlet of a second stage supercharger 65. The supercharger 65 may be driven in a conventional manner from the drive shaft of an aircraft engine 66.

A conduit 70 leads from the outlet of the supercharger 65 to the inlet of the engine 66. An exhaust conduit 73 leads to the inlet of an exhaust gas turbine for driving the supercharger 51. The exhaust conduit 73 has an outlet 74 controlled by a waste gate valve 75.

The waste gate valve 75 is adjustably positioned through a control rod 76 operated by a control arm 77 of a regular 78. The regulator 78 may be of a type such as shown in the U. S. Patent No. 2,358,845 granted September 26, 1944 to Howard A. Alexanderson having a pressure responsive element or bellows operably connected through the regulator 50 and a conduit 80 to the intake manifold 55. The pressure responsive element of the regulator 78 is operably connected through a suitable linkage as shown in the aforenoted patent to a servo valve controlling a servo motor operating the lever 77. The regulator is so arranged that upon an increase in the pressure of the intake manifold 55 above a set value the arm 77 is adjusted in a direction for opening the waste gate valve 75 so as to decrease the speed of the supercharger 51 until the pressure within the intake manifold 55 has decreased to the set value of the regulator.

A decrease in the pressure at the intake manifold 55 below the set value will cause an opposite effect.

An arm 85 is provided for adjusting the pressure setting of the regulator 78, as described in the aforenoted Patent No. 2,358,845 granted September 26, 1944 to Howard A. Alexanderson. The arm 85 may be operated by the pilot from the cabin of the plane through a rod 86 operably connected thereto.

The regulator 78 has provided a pressure inlet orifice 79 opening to the pressure responsive bellows of the regulator 78. Between the orifice 79 and the conduit 80 is the novel regulator 50 having a passage 90, 90A and 90B leading from the conduit 80 to the orifice 79.

The passage 90 has a restricted orifice 91 provided therein opening into the passage 90A which in turn opens into the passage 90B as will be explained.

Passages 94 and 95 lead from the passage 90 at the pressure inlet side of the restricted orifice 91. The passage 94 leads to a recess 97 formed in one end of the regulator 50. The recess 97 is closed by a flexible diaphragm 100 extending across the recess 97 and fastened in place by a cap member 101 suitably fastened to an end of the regulator 50. The cap member 101 has a suitable recess 102 provided therein and a conduit 105 leads into the recess 102.

Plate members 108 and 109 are fastened at opposite sides of the diaphragm 101 by a rivet 110 which is biased under force of the fluid medium in the chamber 102 into contacting relation with valve stem 114 controlling a valve member 115 as will be explained hereinafter. A spring 116 biases the diaphragm 101 in an opposite direction.

The passage 95 leads to a recess 115 formed in the regulator 50 at the opposite end from the recess 97. The recess 115 is closed by a flexible diaphragm 118 extending across the recess 115 and fastened in place by a cap member 120 suitably fastened to an end of the regulator 50 and having a suitable recess 125 formed therein.

The flexible diaphragm 118 has plate members 127 and 128 fastened at opposite sides by a rivet 129. A spring 130 is supported at one end by a plate 133 screw threadedly engaged on an adjusting screw 134 and the opposite end of the spring 130 biases the diaphragm 118 in a direction opposing the biasing force of the fluid pressure in the chamber 115.

The rivet 129 contacts an end of a valve stem 138 for controlling a valve member 140 as will be explained hereinafter.

A pin 141 is fixedly mounted in the cap 120 and is engaged in a suitable slot 142 formed in the plate 133 for preventing rotary movement of the plate 133. The adjusting screw 134 has a flanged portion 143 positioned in a suitable recess formed in the cap 120 and held in the latter recess by a plate 145 secured to the cap 120 by fastening screws. A head 149 of the adjusting screw 134 extends through a suitable orifice formed in the plate 145 and has a cleft portion 150 whereby the screw 134 may be adjusted. Since the plate 133 is screw threadedly engaged on the screw 134 and is held from rotary movement by the pin 142 it will be seen that by rotating the screw 134 by a screw driver or other suitable means longitudinal movement will be imparted to the plate 133 for adjusting the tension of the spring 130.

Extending longitudinally in the regulator 50 is a channel 160. Positioned on opposite ends of the channel 160 are plug members 161 and 162 which are screw threadedly engaged in the channel 160 and positioned in spaced relation one to the other. A channel is formed in the plug member 161 in which is slidably mounted the valve stem 114.

A passage 170 is formed in the member 50 opening at one end to the atmosphere and at the opposite end into a corresponding passage 171 formed on the plug 161 and opening into a passage 172 extending longitudinally in the plug 161. The passage 172 opens into the channel 160 and the latter opening of the passage 172 is controlled by the valve 115 operated through the valve stem 114.

The passage 90 formed in the member 50 opens at the fluid outlet side of the restricted orifice 91 into a passage 90A and the latter passage opens at its opposite end into passage 90B. The passage 90A also opens into a passage 174 extending longitudinally in the plug 162. The passage 174 opens into the channel 160 and the latter opening of the passage 174 is controlled by the valve 140 operated through the valve stem 138. A spring 175 is interposed between the valve members 115 and 140 and biases the respective valve stems 114 and 138 into contacting relation with the rivets 110 and 129 of the diaphragms 101 and 118 respectively. Thus movement of the diaphragms 101 and 118 imparts a movement to the respective valve stem operably contacting the same.

The passage 90B opens at its opposite end into the pressure inlet passage 79 of the regulator 78. A second passage 176 leads from the passage 90B to the chamber 125 so that the diaphragm 118 is actuated by the difference in the pressures acting within the passages 90 and 90A. The latter being the pressure effective between the restricted orifice 91 and the opening 174 to atmosphere.

The conduit 105 leads from the supply line of the water or antiknock fluid injection system previously described into the chamber 102. When the fluid injection system is not in operation the spring 116 forces the diaphragm 101 in a direction toward the chamber 102, whereupon the spring 175 causes the valve 115 to close the opening of the passage 172 so that no air leak is effective upon the passages 90, 90A, or 90B, whereupon the regulator 78 operates in the normal manner at the pressure setting selected through operation of the lever 85.

However, upon initiation of the fluid injection system as by the opening of a supply valve not shown, a fluid medium will be supplied the conduit 105 under pressure of a supply pump or other suitable means well known in the art, whereupon the fluid pressure in the chamber 102 will be increased causing a deflection of the diaphragm 101 in a direction opening the valve 115.

The valve 140 will then be controlled by the diaphragm 118 in response to the difference between the pressure in the passage 90 at the inlet side of the restricted orifice 91 and the pressure in the passage 90A between the restricted orifice 91 and the valve controlled orifice 174. The diaphragm 118 will adjust the valve 174 so as to maintain a predetermined constant difference or drop in pressure between the pressure at the inlet to the restricted orifice 91 and the pressure at the outlet of the restricted orifice 91 regardless of changes in atmospheric pressure due to variations in altitude or other conditions.

This pressure drop or differential in pressure between the passage 90 and 90A may be varied by adjusting the tension of the spring 130 through operation of the adjusting member 134.

Such drop in pressure to the control 78 effects an increase in the pressure setting or datum of the control 78 so that during operation of the water injection system the control 78 will tend to operate the waste gate 75 so as to maintain the pressure in the intake conduit 55 at the latter increased reset value. The said increased boost pressure will permit greater engine power to be obtained during operation of the supplemental fluid injection system than would be otherwise possible.

However, upon the operation of the supplemental fluid injection system being discontinued, the pressure supplied the chamber 102 through the conduit 105 will be decreased, whereupon the spring 116 will cause the valve 115 to close the outlet to atmosphere through the passage 170. In the latter event no flow through conduit 80 from the discharge of supercharger 51 and atmosphere will result. The pressure supplied the regulator 78 through the passage 90B and the supercharger 51 discharge pressure will then be the same. Thus the setting or datum of the regulator 78 upon the closing of the valve 115 will be returned to the normal operating pressure.

Although only two embodiments of the invention have been illustrated and described, various changes in the form and relative arrangement of the parts which will now appear to those skilled in the art may be made without departing from the scope of the invention. Reference is therefore to be had to the appended claims for a definition of the limits of the invention.

What is claimed is:

1. A device of the character described, comprising, in combination, a conduit for conducting a superatmospheric pressure medium, said conduit having a restricted orifice positioned therein intermediate the inlet and outlet of said conduit and an airleak therein at the outlet side of said restricted orifice, a first valve member for opening and closing said air leak, a second valve member for regulating said airleak, spring means positioned between said first and second valve members for biasing said valve members in a direction for closing said airleak, operator-operated means for controlling said first valve member, and differential pressure responsive means for operating said second valve member upon said first valve member being in an open position, said differential pressure responsive means being responsive to the difference between the pressures at the inlet and outlet of said restricted orifice and arranged to operate said second valve member so as to maintain a predetermined substantially constant differential between the pressures at the inlet and outlet of said restricted orifice.

2. A device of the character described, comprising, in combination, a conduit for conducting a superatmospheric pressure medium, said conduit having a restricted orifice positioned therein intermediate the inlet and outlet of said conduit and an airleak therein at the outlet side of said restricted orifice, a first valve member for opening and closing said airleak, a second valve member for regulating said airleak, spring means positioned between said first and second valve members for biasing said valve members in a direction for closing said airleak, operator-operated means for controlling said first valve member, differential pressure responsive means for operating said second valve member upon said first valve member being in an open position, said differential pressure responsive means being responsive to the difference between the pressures at the inlet and outlet of said restricted orifice and arranged to operate said second valve member so as to maintain a predetermined substantially constant differential between the pressures at the inlet and outlet of said restricted orifice, and adjustable spring means for varying the value of said differential.

3. For use with an internal combustion aircraft engine having a supercharger for supplying air to the induction system of the engine, a supplemental fluid injection system, and a boost control for regulating said supercharger; means for changing the datum of said boost control, comprising, in combination, a casing having formed therein a passage adapted to connect the induction system to said boost control to supply a controlling fluid pressure to the boost control, a second passage in said casing providing a fluid pressure leak for the first mentioned passage, a restriction in said first passage at one side of said fluid pressure leak, a first valve member for controlling said second passage, a second valve member for regulating said second passage, a first control member positioned in one end of said casing for controlling said first valve member, a second control member positioned in the opposite end of said casing for regulating said second valve member, said second control member responsive to differential fluid pressures acting at opposite sides of said restriction to regulate said second valve member and thereby maintain a predetermined differential between such fluid pressures, and said first control member responsive to operation of the supplemental fluid injection system of said engine to actuate said first valve member to a position opening said second passage to thereby permit operation of said second valve member.

4. The combination defined by claim 3 in which said second passage extends transverse said first passage, and said first and second valve members are positioned in axial alignment in said second passage and extend toward opposite ends of said casing.

5. For use with an internal combustion aircraft engine having a supercharger for supplying air to the induction system of the engine, a supplemental fluid injection system, and a boost control for regulating said supercharger; means for changing the datum of said boost control, comprising, in combination, a casing, a conduit extending through said casing for connecting said induction system to said boost control to supply a controlling fluid pressure to the boost control, said conduit having a fluid pressure leak, a first restriction in said conduit between the induction system and boost control, a second restriction between the conduit and the fluid pressure leak, and control means for said fluid pressure leak including a valve and a member operatively connected to said valve and mounted in said casing, and said member responsive to operation of the supplemental fluid injection system of said engine.

6. The combination defined by claim 5 including in said casing a second valve to vary one of said restrictions, and a differential pressure responsive member for regulating said valve so as to maintain a constant differential between the pressure in said induction system and the pressure supplied said boost control.

HAROLD A. WHEELER.

REFERENCES CITED

The following references are of record in the file of this patent:

UNITED STATES PATENTS

| Number | Name | Date |
| --- | --- | --- |
| 1,641,944 | Bristol | Sept. 6, 1927 |
| 1,699,676 | Rush | Jan. 22, 1929 |
| 1,713,833 | Kochendorfer | May 21, 1929 |
| 1,787,686 | Kerr | Jan. 6, 1931 |
| 1,934,758 | Temple | Nov. 14, 1933 |
| 2,098,914 | Gorrie | Nov. 9, 1937 |
| 2,233,307 | Dodson | Feb. 25, 1941 |
| 2,272,684 | Vickers | Feb. 10, 1942 |